United States Patent
Dye

(10) Patent No.: US 7,318,677 B2
(45) Date of Patent: Jan. 15, 2008

(54) OPTICAL FIBER CONNECTOR ASSEMBLY

(75) Inventor: David E. Dye, Rancho Santa Margari, CA (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 11/314,609

(22) Filed: Dec. 20, 2005

(65) Prior Publication Data

US 2006/0171638 A1 Aug. 3, 2006

Related U.S. Application Data

(60) Provisional application No. 60/636,879, filed on Dec. 20, 2004.

(51) Int. Cl.
G02B 6/36 (2006.01)

(52) U.S. Cl. .............................. 385/78; 385/53; 385/76; 385/77

(58) Field of Classification Search .................. 385/53, 385/76–78
See application file for complete search history.

(56) References Cited

U.S. PATENT DOCUMENTS 6,254,283 B1 * 7/2001 Novacoski et al. ........... 385/78

\* cited by examiner

*Primary Examiner*—Jennifer Doan
(74) *Attorney, Agent, or Firm*—Thomas D. Paulius

(57) ABSTRACT

An optical fiber connector includes a connector housing having first and second generally parallel, spaced apart first and second faces and at least one generally cylindrical receptacle for removably receiving an optical fiber terminus therein. An optical fiber terminus is located within the receptacle and includes an elongated body with a passage along a central axis for receiving a portion of an optical fiber cable therethrough. The body further includes an indexing section, and a ferrule secured to the body and having an end portion of said optical fiber cable therein. A collar is positioned on the elongated body and has an engagement section for engaging the indexing section. The collar is movable along the axis between first and second operative positions. In the first operative position relative rotational movement between the collar and the body is prevented and in the second operative position the collar may rotate relative to the body. A biasing member is provided to bias the collar towards the first operative position.

21 Claims, 8 Drawing Sheets

OPTICAL FIBER CONNECTOR ASSEMBLY

REFERENCE TO RELATED APPLICATION

This application claims priority form prior U.S. Provisional patent application No. 60/636,879, filed Dec. 20, 2004.

BACKGROUND OF THE INVENTION

The present invention relates to an apparatus for interconnecting optical devices and, more particularly, to a connector for terminating an optical fiber.

Optical fiber connectors are an essential part of substantially any optical fiber based communication system. For instance, such connectors may be used to join segments of fiber into longer lengths, to connect fiber to active devices such as transceivers, detectors and repeaters, or to connect fiber to passive devices such as switches and attenuators. The central function of an optical fiber connector is to maintain or position two optical fiber ends such that the core of one fiber is axially aligned with the core of the other fiber. Consequently, the light from one fiber is coupled to the other fiber or transferred between the fibers as efficiently as possible. This is a particularly challenging task because the light-carrying region or core of an optical fiber is quite small. In single mode optical fibers, the core diameter is about 9 microns. In multi-mode fibers, the core can be as large as 62.5 to 100 microns, and hence alignment is less critical. However, precision alignment is still a necessary feature to effectively interconnect the optical fibers.

Another function of the optical fiber connector is to provide mechanical stability to and protection for the optical junction in its working environment. Achieving low insertion loss in coupling two fibers is generally a function of the alignment of the fiber ends, the width of the gap between the ends, and the optical surface condition of either or both ends. Stability and junction protection is generally a function of connector design (e.g., minimization of the different thermal expansion and mechanical movement effects). Precision alignment of the optical fiber is typically accomplished within the design of the optical terminus assembly. The typical optical terminus assembly utilizes a method of retention of the terminus within the connector(s) integrated within it and a method of holding and aligning the optical fiber. To align the optical fiber, a terminus typically includes a small cylinder of metal or ceramic at one end commonly referred to as a "ferrule." The ferrule has a high precision hole passing along it centerline and glass or plastic optical fiber can be installed into the hole within the ferrule using mechanical, adhesive or other retention methods. The primary operational sections of an optical terminus are the support structure around the ferrule and the mechanism (typically a spring) used to create a force to push the ferrule into an opposing ferrule of a mating optical connector.

In a connection between a pair of optical fibers, a pair of ferrules is butted together in an end to end manner and light travels from one to the other along their common central axis. In this conventional optical connection, it is highly desirable for the cores of the glass fibers to be precisely aligned in order to minimize the loss of light (such loss being referred to as insertion loss) caused by the connection. As one might expect, it is presently impossible to make a perfect connection. Manufacturing tolerances may approach "zero" but practical considerations such as cost, and the fact that slight misalignment is tolerable, suggest that perfection is unnecessary although stability across the operating environment of the fiber joint is critical.

Historically, due to manufacturing costs and design features, optical termini have tended to be manufactured as an assembly of loose components. In high performance connectors intended for single mode application, there exists a specific need to tune out the eccentricity of assemblies and such tuning has been achieved by the interaction between the terminus or ferrule support structure and the connector housing. This is an undesirable effect as the housing becomes an integral element in tuning and if the terminus is removed from the housing (such as for cleaning or replacement), the tuning is in effect lost.

Optical terminus assembly tuning is used to reduce the random position of the optical fiber within an optical connector. The randomness of this positioning may be in the order of fractions of microns to several microns. However, when consideration is taken of single mode optical fiber with an optical waveguide of only 8-9 microns in diameter, it can be seen how optical insertion loss can be dramatically impacted if control of the placement of the optical core is not maintained. Fiber eccentricity compensation is currently most commonly found on single channel "LC" style connectors. Compensation is attained using a faceted structure (such as a square or hexagon) to register on the front end of the ferrule support structure. The support structure engages an appropriate complementary pattern within the LC connector body and retains positioning by engaging the LC body. Thus tuning or fiber eccentricity compensation is only retained as the ferrule and its support is retained within the connector body. Once removed it is not possible to determine the exact positional relationship between the fiber holding structure and the connector body.

Recognizing the engineering challenge posed by the alignment of two very small optical fiber cores, it is desirable to provide termini that are smaller, less expensive, and yet more convenient for customers to manipulate. One of the key features associated with the design of termini is the system for retaining the termini in a connector. The retention feature affects the ability of the terminus to be engaged into a connector system and retained within the connector system during mating of the two connector halves. The retention system must enable users of the optical terminus system and its associated connector system the ability to remove the optical termini individually for service, repair, inspection or other reasons. Existing optical termini systems are typically utilized in military connector systems and some designs incorporate anti-rotation features but none include an operative retention system and tuning capability as an integral part of the terminus.

SUMMARY OF THE INVENTION

It is an object of the present invention to provide a terminus retention system that removes complexity from the connector system and enables users to quickly service connectors, yet retain the tuning of a terminus. As such, a connector is disclosed for terminating an optical fiber including a fiber holding structure for maintaining eccentricity compensation and having an end face in which an associated fiber is terminated within the holding structure and including an axial passageway which terminates in the end face and which is adapted to receive an end portion of the associated optical fiber. A connector housing has internal surfaces that define a cavity to accept the fiber-holding structure and includes first and second openings extending into the cavity and being positioned at opposite ends of the housing. The first opening is configured to receive an optical fiber and the second opening is configured to enable the end face of the holding structure to protrude through the opening. A latch is provided integral to the fiber holding structure to secure the fiber holding structure within an associated cavity. To preclude unintended decoupling therebetween, the latch includes a protrusion positioned on one or more surfaces of a sliding collar integral to the fiber holding structure. The latch is configured to engage the cavity structure by having the protrusion sweep an arc beneath an upper surface of the cavity. When the latch protrusion is swept through the arc, it is held beneath the rear face of the cavity by spring pressure created by compression of a primarily helical spring coaxially located along the fiber holding structure longitudinal axis.

In the preferred embodiment, the spring member interacts between two surfaces within the fiber-holding structure. The fiber holding structure also provides a keying structure to engage the housing and likewise urge an end face or ferrule through the second opening in the housing.

The terminus is a cylindrical fiber-holding structure with a ferrule that includes the end face in which the associated fiber is terminated and an axial passageway which terminates in the end face. This passageway is adapted to receive an uncoated end portion of the associated fiber. A base member holds an end portion of the ferrule within the terminus assembly and includes an axial passageway which is collinear with the axial passageway of the ferrule. A shoulder may also be provided to engage a spring of the terminus assembly. A rear portion of the base member provides a multi-positional eccentricity index feature, such as a hexagonal section. A sliding collar which has a shoulder to engage a spring, an axial pass way in which the base member assembly is positioned and an external index "key" formed by one or more protrusions. A spring member is provided to push the sliding collar towards the rear of the base member. In one embodiment, the cylindrical ferrule has a diameter of about 1.25 millimeters.

The cylindrical plug of the present invention includes a tube whose outer cylinder surface has a circular cross section and whose axial passageway is substantially concentric with the outer cylinder surface and wherein the tube is made from ceramic or metallic materials. The fiber-holding structure is adapted to be held within the housing in a singular stable angular position such that the angular position of the fiber-holding structure with respect to the housing is constant. In addition, the fiber-holding structure sliding collar index key allows the entire fiber-holding structure to be removed from the connector housing yet maintain its singular stable angular position when returned to the connector housing. The connector housing includes first and second interconnecting housing members which each include an internal cavity for receiving the fiber-carrying structure. The second interconnecting member is generally cylindrical in shape so as to mate with the first interconnecting member. The first and second interconnecting members combine to form a structure that substantially encloses the fiber-holding structure. The first and second interconnecting members are made from a metallic, plastic or ceramic material and are secured together using a positive locking device such as a threaded collar, a coupling screw or external physical clamp.

An optical cable and a connector are also disclosed in which the optical cable includes a glass fiber enclosed within a plastic buffer material and the connector includes a fiber-holding structure with an axial passageway which receives the optical fiber and which terminates in a planar end face that is perpendicular to the passageway. A housing has internal surfaces that define a cavity and surround the fiber-holding structure as well as a first opening at the back end of the housing which receives the optical cable and a second opening at the front end of the housing through which the end face of the fiber-holding structure protrudes. The openings extend into the cavity and are positioned at opposite ends of the housing. The housing captures the fiber holding structure in a manner such that eccentricity is confined to a unique, known position. A manually operated latch for securing the fiber holding structure to the associated receptacle is also provided to preclude unintended decoupling therebetween. The latch is positioned on a one or more side surfaces of the sliding collar section integrated within the fiber holding structure. The latch includes a spring element contained within the fiber holding structure. The fiber-holding structure includes an annular spring that interacts with two flanges or shoulders within the fiber-holding structure. One of the shoulders is free to move relative to the other along the primary axis of the fiber-holding structure and engages the housing thus urging the end face of the fiber-holding structure through the second opening in the housing.

A connector for terminating an optical fiber includes a fiber-holding structure that terminates in an end face and is adapted to receive an end portion of the optical fiber. A housing includes a plurality of internal surfaces that define a cavity and surround the fiber-holding structure, a first opening for receiving an optical fiber holding structure/optical fiber and a second opening for enabling the end face of the fiber-holding structure to protrude therethrough. The openings extend into the cavity and are positioned at opposite ends of an axial passageway through the housing. The fiber-holding structure includes a compression spring which presses two shoulders or flanges on the fiber holding structure. The flanges are free to move axially relative to one another to urge the end face of the fiber-holding structure through the second opening in the housing.

An optical fiber connector is disclosed for effecting optical end-to-end coupling between two optical fibers, each of which terminates in a ferrule having a precision cylindrical outside surface. One end of each ferrule is held within an opening in a base member. The base member is generally cylindrical and has a flange which is disposed around the circumference of the base member and interacts with one end of an annular spring which is also disposed around the base member. The ferrule, base member and spring are joined to a secondary member that includes a hexagonal or other even sided geometric shaped indexing feature. A sliding member including a latch protrusion feature that engages the secondary member to permit indexing of the hexagonal or other even sided geometric shaped indexing feature and further engages a connector body housing. This engagement is accomplished with one or more unique indexing keys that extend approximately perpendicular to the longitudinal axis of the siding member and engage an appropriate slot in the connector body housing.

An optical fiber terminus body has a helical spring trapped between front shoulder on a main inner body and a rear shoulder created by a thin flange on a sliding collar. The sliding collar is likewise trapped between the rear of the spring and a rear shoulder on the main inner body. Typically, the inner body is formed using two components that are pressed, bonded, welded or otherwise assembled. The collar has an alignment ring on it to retain precise alignment of the terminus within a stepped cylindrical bore. The collar also has a protrusion that enables keying and positive positioning of the terminus assembly within a stepped cylindrical bore when the bore has an appropriate slot formed in it or a slot that is created with a secondary piece. The slot is configured with a cut that extends along an arc around the axis of the bore so that the protrusion can act as a retainer mechanism for the terminus assembly in the cylindrical bore. This is accomplished by inserting the terminus into the bore until the front edge of the section having the front spring retention shoulder engages a step in the bore. This presents further penetration of the terminus assembly through the stepped bore. At that time, the sliding collar begins to move forward along the main inner body. The protrusion on the collar moves through the slot along the side of the bore and the spring is compressed. As the protrusion on the collar reaches the end of the slot in the bore, it can be rotated in an undercut arc in the bore. When rotated to the end of the arc, the protrusion cannot pass back upward along the axis of the bore. Hence, there remains compression of the spring and the entire assembly is captured within the bore by the spring pressure between the front shoulder on the main inner body and the sliding collar that has engaged the cylindrical bore. To facilitate tuning of the terminus, a hexagonal or other faceted shaped section integral to the main terminus body is provided at the rear of the main terminus body and engages the sliding collar. The hexagonal or other faceted shaped section is included to allow tuning or minimization of eccentricity of the internal bore relative to a mating terminus of the same type. Tuning is accomplished by determining a desired position for the offset in the bore centerline in the main inner body relative to the sliding collar. If a hexagonal tuning section is used, one of six positions is available. The sliding collar engages one of the available tuning sections on the main inner bodies. These and other objects, features and advantages of the present invention will be clearly understood through a consideration of the following detailed description.

BRIEF DESCRIPTION OF THE DRAWINGS

Other objects and advantages of the present invention will be understood from the following description according to one preferred embodiment of the present invention which is shown in accompanying drawings in which.

DETAILED DESCRIPTION OF THE PREFERRED EMBODIMENT

Figure 1:
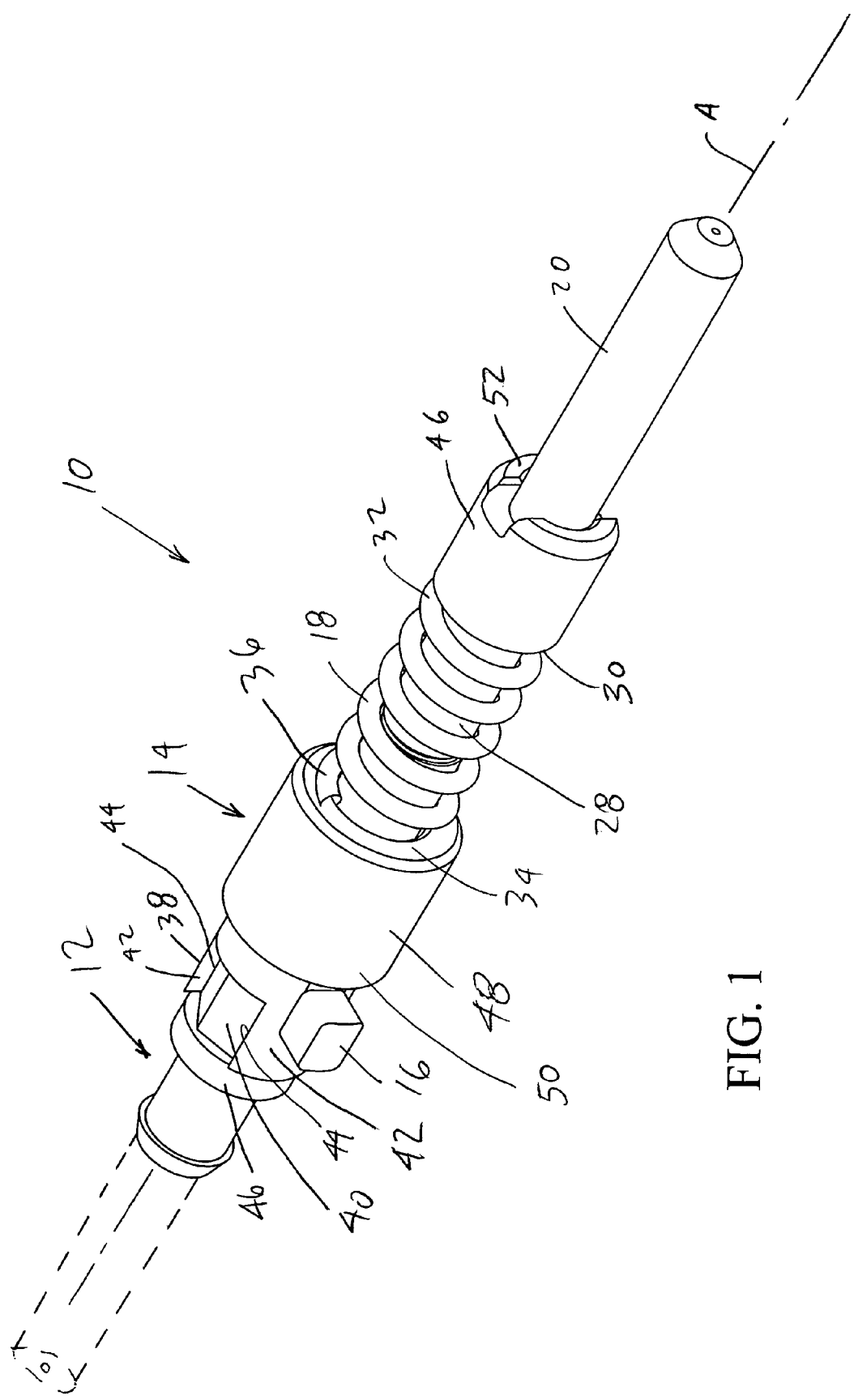
FIG. 1 is a perspective view of one embodiment of an optical fiber terminus in accordance with the principles of the present invention.
Figure 2:
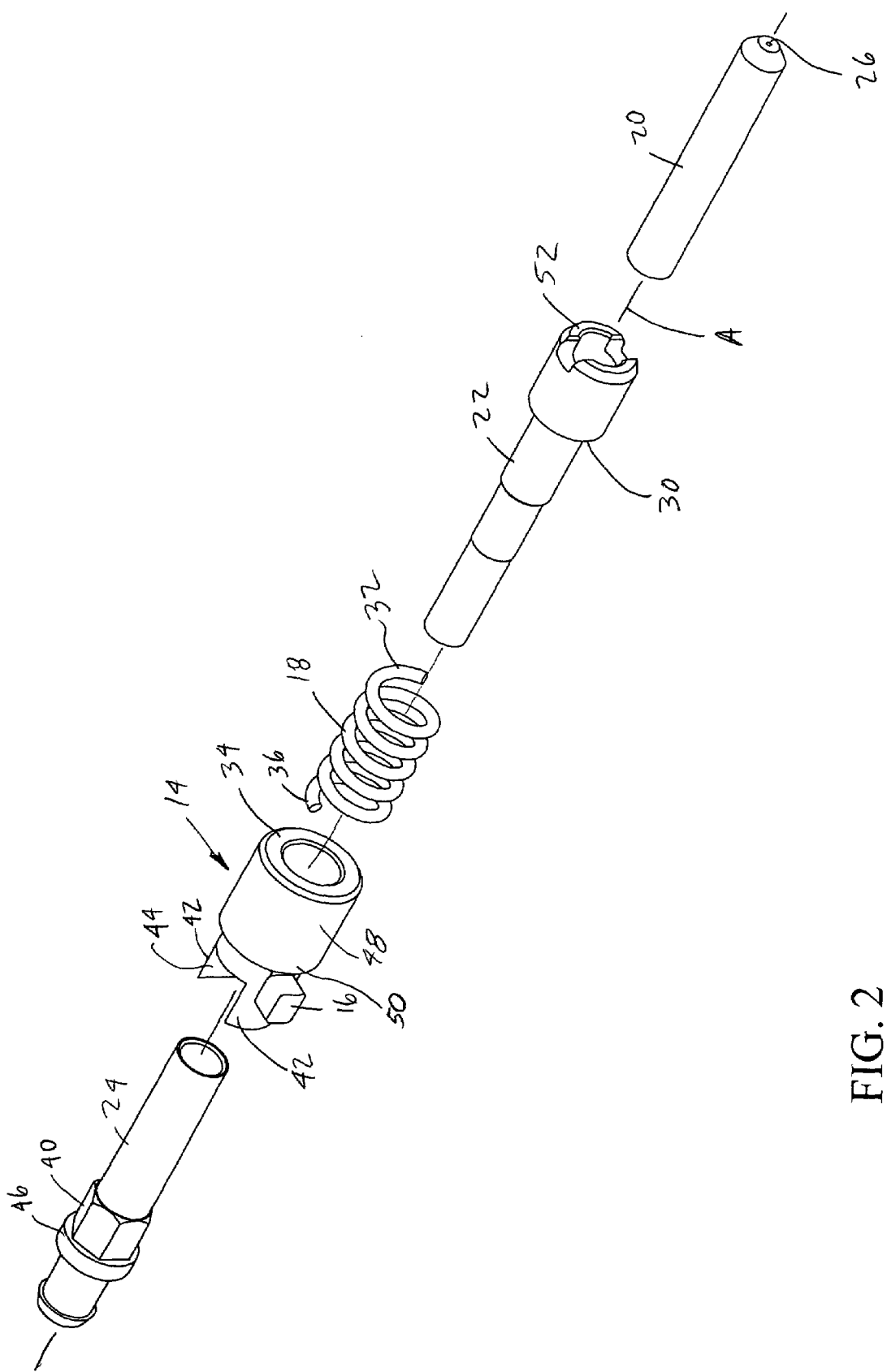
FIG. 2 is an exploded perspective view of the optical fiber terminus of FIG. 1.
Figure 4:
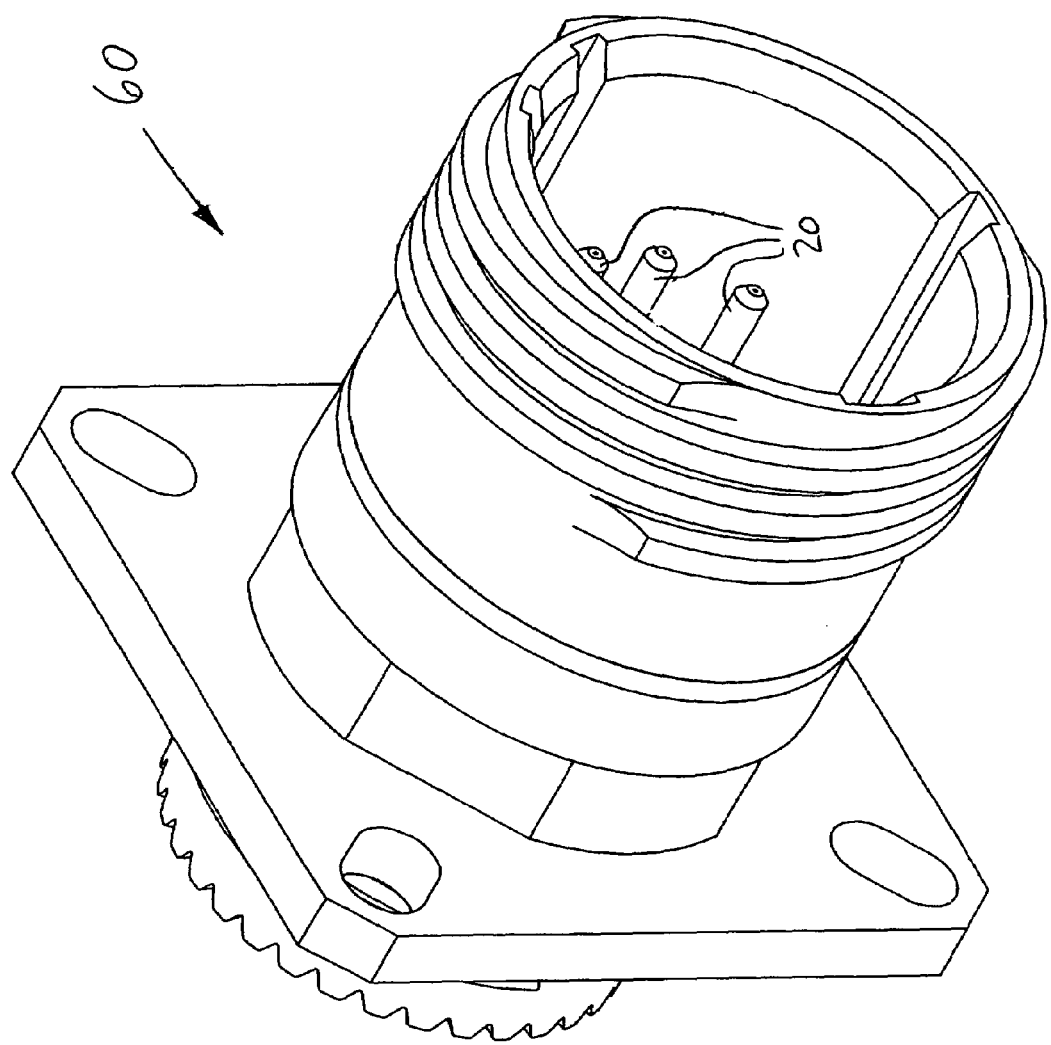
FIG. 4 is a perspective view of one embodiment of an optical fiber connector in accordance with the principles of the present invention including a plurality of optical fiber termini of FIG. 1 mounted therein.

In accordance with one embodiment of the present invention and referring first to FIGS. 1 and 4, an optical fiber support assembly or terminus 10 and an optical fiber connector 60 that includes a plurality of termini, as well as a method of assembly, are disclosed. The terminus includes three main components, inner main body or member 12, a sliding collar or outer member 14 with protrusion boss or tab 16 extending radially therefrom and substantially helical spring or biasing member 18. The inner main body is typically an assembly of three components (FIG. 2) a ferrule 20 (typically made of ceramic or metal), a forward section or body 22 that is joined to the ferrule with an adhesive or by a press-fit and a rear section or body 24 that is assembled with forward section 22 and captures the sliding collar and helical spring 18 therebetween. As described in more detail below, sliding collar 16 is indexable through the interaction between registration structure integral to the collar and indexing structure integral to the rear of inner main body. The sliding collar is further indexed relative to the connector assembly by the interaction of features included in the connector body and the protrusion on the sliding collar.

Figure 3:
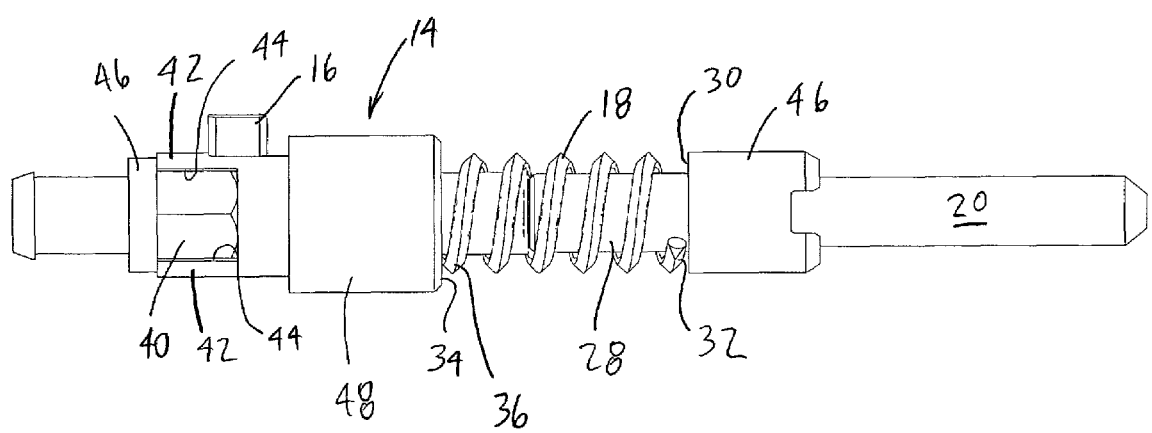
FIG. 3 is a side elevational view of the optical fiber terminus of FIG. 1.

As described above, the terminus 10 has a ferrule 20 attached to the inner main body to position an optical fiber along the longitudinal centerline or axis "A" of the terminus assembly. The terminus has an opening or bore 26 therein for receiving an end of an optical fiber. The inner main body 12 has a shaft portion 28 (FIGS. 1 and 3) formed by the combination of forward section 22 and rear section 24 about which the spring 18 can be positioned and aligned. A forward shoulder 30 on main body 12 forms a front abutment that abuts a front end 32 of the spring, and a shaft recess forming a shoulder. Sliding collar 14 is also installed onto the shaft portion 28 of the main inner body 12 adjacent spring 18.

Sliding collar forms the rear abutment 34 that abuts the rear end 36 of the spring. An engagement section 38 is formed at the rear of collar 14 with opposing arms 42 having inwardly facing flat surfaces 44. The flat surfaces 44 of the arms engage a multi-faceted (typically hexagon) indexing section 40 on the rearward end of the inner main body. Opposing arms 42 engage opposite sides of the hexagonal indexing section 40 to prevent rotation of the collar 14 relative to the inner main body 12 and further enable selection of multiple orientations of the inner main body relative to the collar 14 and the protrusion boss 16 projecting therefrom. The main terminus body 12 has a rear shoulder 46 that prevents the collar 16 and spring 18 from sliding off the shaft 28 and provides a pre-load compression of the spring when assembled. The main terminus body 12 is typically a two piece component that is either press fit together, bonded together, welded together or affixed together into a single piece using another method of securement. The assembly of ferrule 20, main terminus body 12, spring 18 and sliding collar 16 is commonly referred to as a terminus assembly.

Figure 5:
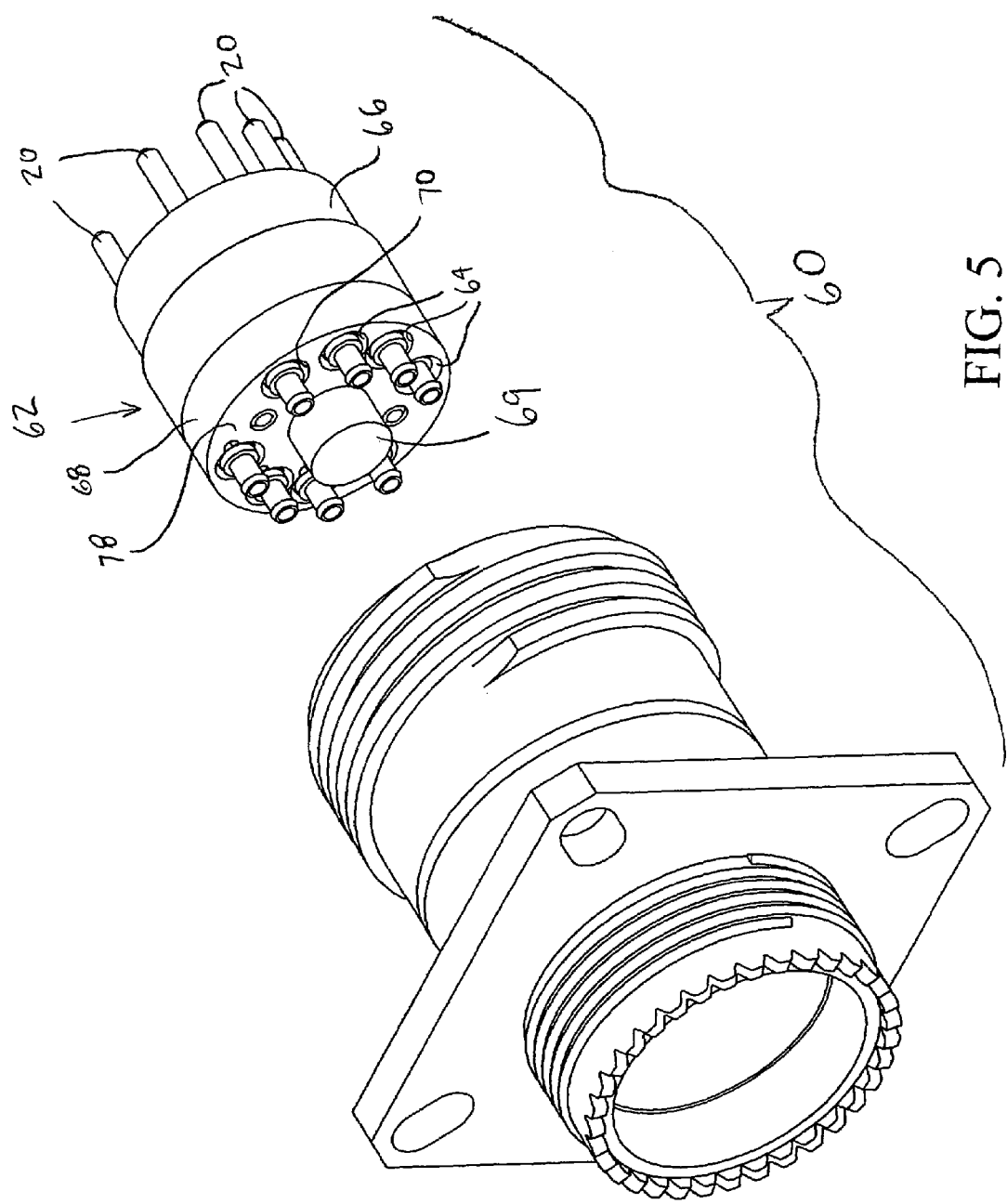
FIG. 5 is a partially exploded perspective view of the optical fiber connector of FIG. 4 from a different orientation with a central portion of the connector housing removed from an outer shell of the connector.
Figure 6:
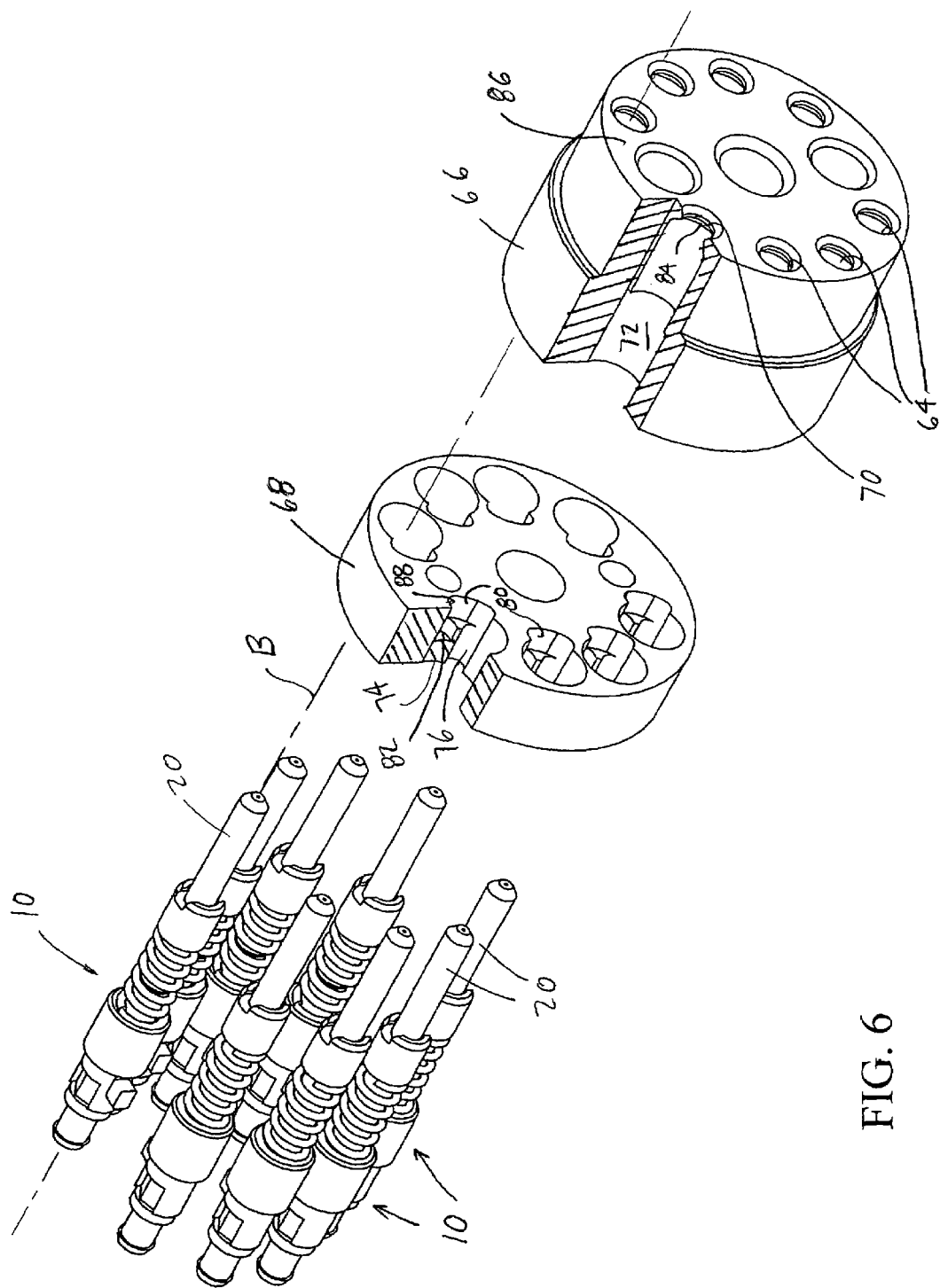
FIG. 6 is an exploded perspective view of the central portion of the connector housing together with a plurality of optical fiber termini.
Figures 7A, 7B, 7C, 7D:
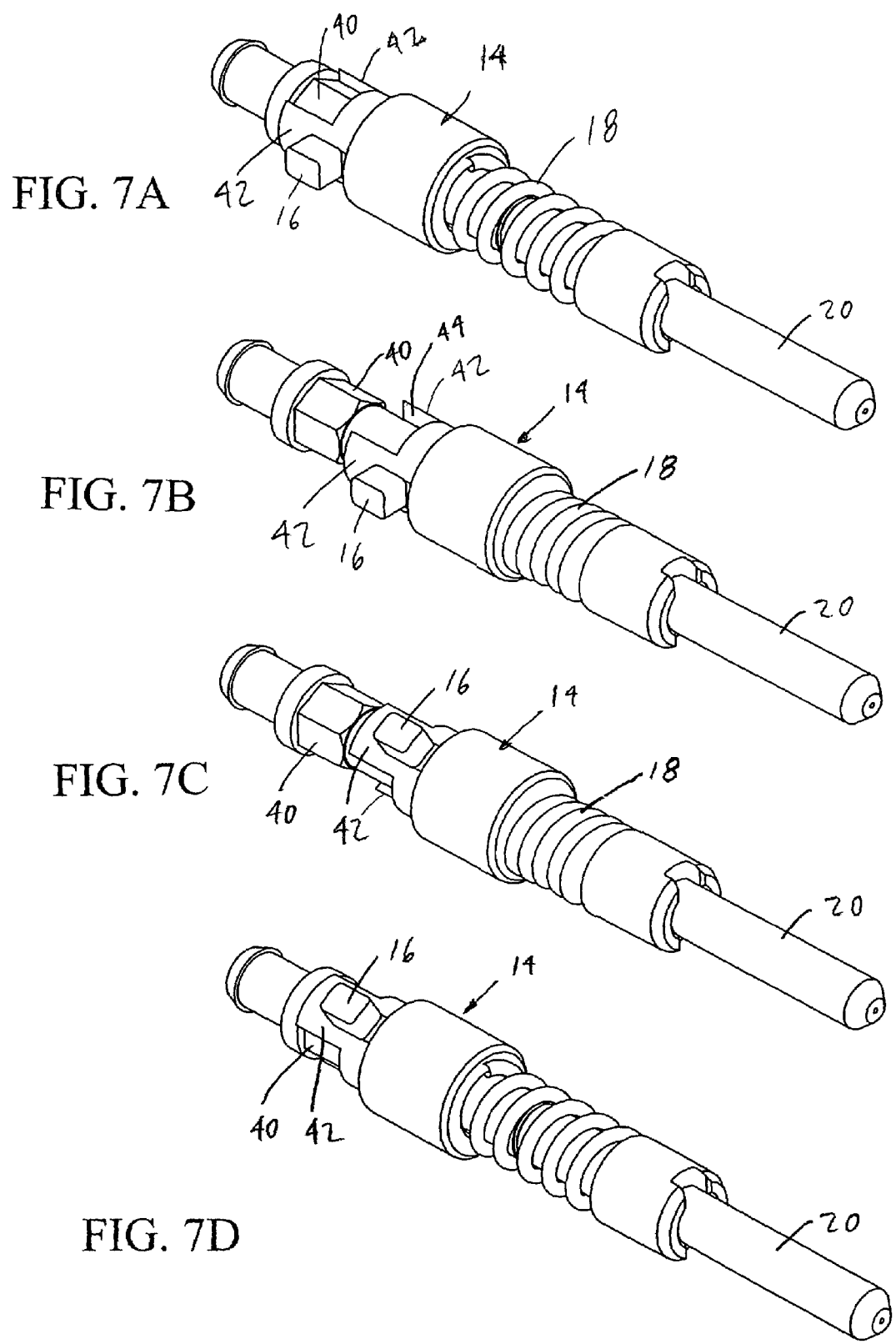
FIGS. 7A-7D are perspective views of the optical fiber terminus showing a portion of the sequence of tuning the optical fiber terminus by axially moving and rotating the sliding collar relative to the inner main body.

Referring to FIGS. 4-6, the terminus assembly 10 must be retained within a connector housing or body 62 in order to form a single or multiple optical pathways interconnect system. An interconnect system is typically formed with a plug connector (not shown) and a mating receptacle connector 60. During mating, opposing optical termini are brought into direct end face contact with one another and the optical fiber (shown in phantom lines in FIG. 1) positioned within each terminus are optically coupled together. When mating of the optical termini is properly implemented, a very low optical loss interconnection is formed. When utilizing termini of the present invention, arrays of very dense, very high performance optical interconnect solutions can be formed.

The terminus assembly 10 is retained within connector housing 62 through the interaction between the protrusion boss 16 on sliding collar 14 and structure of the connector housing. Retention is achieved when the terminus assembly 12 is installed into a principally cylindrical bore or terminus cavity 64 within a connector housing or body 62. In the preferred embodiment, the connector housing is formed from two components, a front housing member 66 and a rear housing member 68. The front and rear housing members are made of metal, plastic or ceramic and are held together by a positive locking device such as a coupling screw 69 although other devices such as a threaded collar or an external physical clamp could be used.

The terminus cavity has two or more primary diameters. A smaller, forward diameter 70 generally approximates the diameter of the ferrule 20 and is smaller than the diameter of the leading section 52 of forward section 22 into which the ferrule is pressed. The largest diameter 72 in the terminus cavity is adjacent the rear of the connector and this diameter is slightly larger than the diameter of the main body 48 of the sliding collar. In the embodiment shown, the sliding collar has a full periphery precision shoulder 50 that interacts with the rear bore diameter 72 to provide very precise alignment of the sliding collar 14 with respect to the rear bore diameter of the terminus cavity. This is desirable to maintain axial alignment of the entire optical termini assembly 10 relative to the axis of the terminus cavity. Other methods of precision alignment may be feasible such as multiple raised sections or a precision machined main body for the sliding collar.

Referring to FIG. 6, the rear opening 74 of the bore in the terminus cavity 64 has a slot 76 extending from a rear face 78 of the housing along an edge of the bore a relatively short distance into the terminus cavity. An arcuate retention slot or recess 80 extends along an arc from the slot 76 with the arc being formed about the central axis "B" of the cavity and principally perpendicular to the slot. This arcuate recess forms a turning section adjacent the slot that extends generally at a right angle to axis B. A small recess 82 is added at the end of the arc in a direction parallel to the central axis of the cavity for receiving the protrusion boss 16 of sliding collar 14 to secure the terminus assembly 10 in the housing as described below.

Figure 8C:
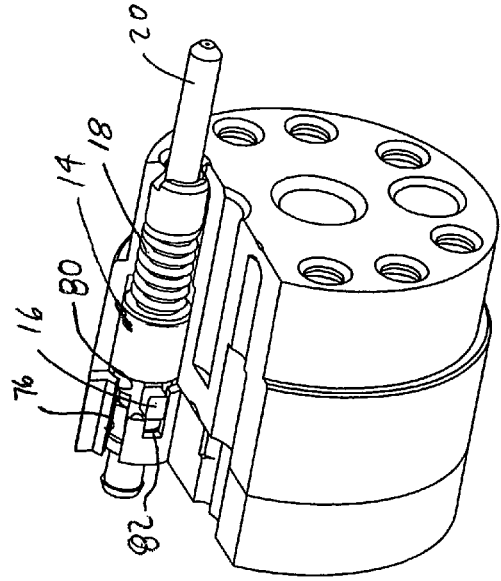
FIGS. 8A-8D are perspective views, partially in section, of the optical fiber terminus and central portion of the connector housing showing the sequence of insertion of the optical fiber terminus into the housing and locking of the terminus therein.
Figure 8D:
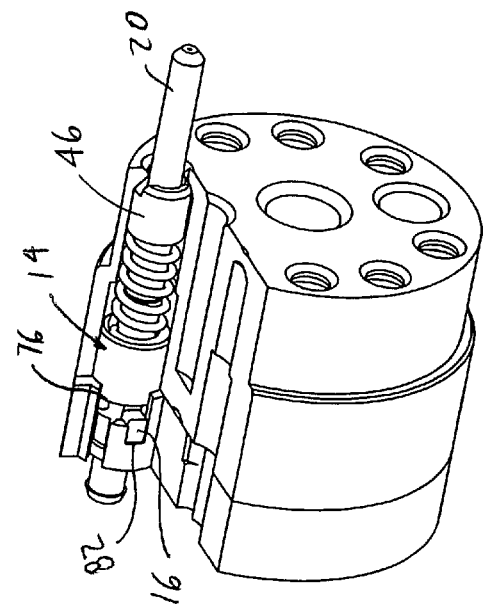
Figure 8A:
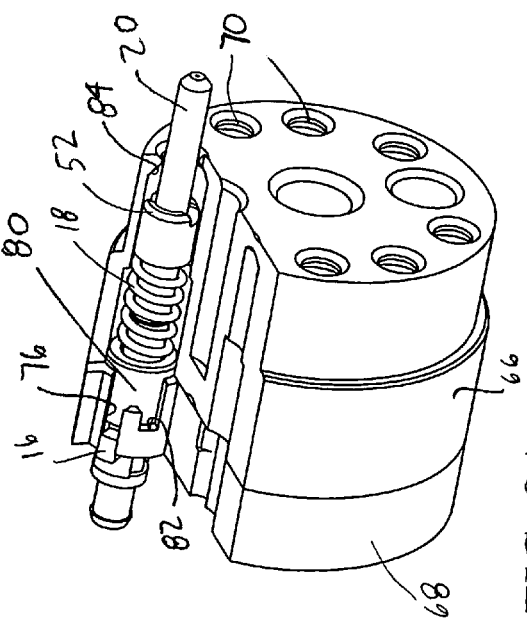
Figure 8B:
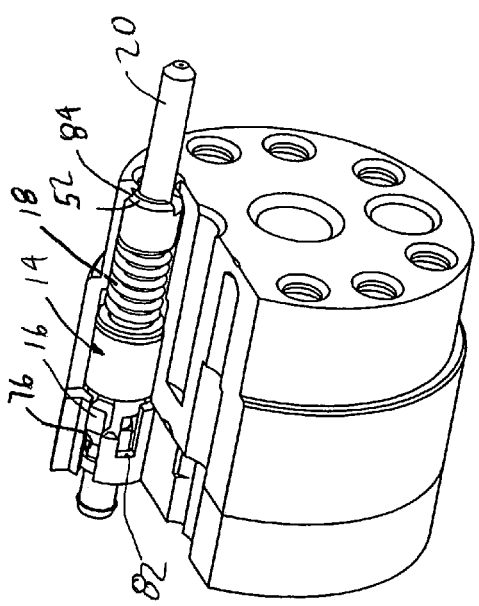

During assembly, the terminus assembly is retained within the housing by positioning the terminus assembly 10 at the rear of the terminus cavity 64 with protrusion boss 16 and slot 76 aligned as shown in FIG. 8A and moving terminus assembly 10 along the central axis B of the cavity 64 by gripping or engaging the sliding collar 14 with an appropriate tool (not shown). This forward movement continues until the front or forward edge or shoulder 52 of the inner terminus body engages the forward wall 84 of the smaller diameter bore 70 in the terminus cavity. The ferrule 20 will be extending through front face 86 of the terminus cavity bore and positions the terminus assembly 10 to substantially a central location along the terminus cavity 64 so that the central axis B of the cavity and the central axis A of the terminus assembly coincide. When front edge 52 of the terminus inner body 12 engages the front face in the terminus cavity, forward movement of inner body 12 is stopped. By continuing to apply force to sliding collar 14, collar 14 continues to move forward relative to terminus inner body 12 and, thus, also compressing spring 18 that is an integral part of terminus assembly 10. (FIG. 8B) The protrusion boss 16 on the terminus collar 14 is aligned with the slot in the wall of the terminus cavity and passes along it until it reaches the end of the slot. Preferably, the opposing arms 42 of collar 14 and hexagonal indexing section 40 are dimensioned so that arms 42 still engage indexing section 40 when protrusion boss 16 reaches the end of the terminus cavity slot. Through such structure, the tuning of terminus assembly 10 is not affected or changed during insertion of the assembly into the terminus cavity.

Referring to FIG. 8C, once protrusion boss 16 abuts the end of slot 76, the collar 14 and entire terminus assembly 10 are rotated together about the axis B of the terminus cavity with protrusion boss 16 traveling through arcuate retention slot 80 until the protrusion boss 16 engages the end wall 88 of the arcuate retention slot. As force is released from the collar 14 such as by a technician installing the terminus assembly, spring 18 provides a force that pushes collar 14 axially rearward so that protrusion boss 16 enters recess 82 at the end of the arcuate retention slot 80 to retain the protrusion boss therein (FIG. 8D). This spring force maintains the terminus assembly 10 both radially and axially in the terminus cavity bore 64 and hence within the connector assembly 60. In other words, the orientation of the terminus assembly is retained in a predetermined position since the position of collar 14 is determined by the location of the arcuate retention slot, and the terminus inner body 12 is fixed relative to collar 14 by the indexing features, as described above. In industrial vernacular, the terminus retention system described above is known as a "quarter turn" fastener, although in the present embodiment, the quarter turn fastener is modified in that only a single protrusion boss 16 is used. In addition, the single protrusion boss 16 is what enables tuning of the optical connector system.

The present invention incorporates an optical ferrule holding structure 10, termed the optical terminus assembly and a support structure, termed the connector. The connector has an optical terminus cavity for each channel in a single or multiple channel connector system. The cavity has a "key" feature that identifies positional location for proper tuning by aligning the protrusion boss 16 feature on the sliding collar 14 of opposing termini to be in-line. In this manner, by establishing eccentricity compensation relative to the protrusion boss, the relative eccentricity of two mating ferrules will be minimized and the resulting optical loss likewise minimized. Further, according to the present invention, by properly positioning the boss and retaining it within the connector body, the entire assembly can retain its eccentricity compensation even when the fiber support structure or terminus 10 is removed from the connector body.

Since retaining eccentricity compensation is a key feature of the disclosed invention, it is important to understand the eccentricity issues. Alignment variations between a pair of interconnected ferrules 20 are principally attributable to the parameter known as "eccentricity" of the optical fiber core with respect to the ferrule. Eccentricity is defined as the distance between the longitudinal centroidal axis of the ferrule at an end face of the ferrule and the centroidal axis of the optical fiber core held within the passageway of the ferrule. Generally, the passageway is not exactly concentric with the outer cylindrical surface that is the reference surface. Also, the optical fiber may not be exactly centered within the ferrule passageway and the fiber core may not be exactly concentric with the outer surface of the fiber. Hence, the eccentricity is comprised of the eccentricity of the optical fiber within the ferrule passageway and the eccentricity of the passageway within the ferrule.

If one could view the end portion of a "lit" optical fiber, what would be seen is a circle with a dot of light somewhat displaced from the exact center of the circle. Eccentricity can be understood as a two-dimensional vector having magnitude and direction components. The "magnitude component" of the eccentricity vector is the straight line distance between the center of the circle and the dot of light, while the "direction component" of the eccentricity vector is the angle made by that straight line with respect to the X-axis of a 2-dimensional Cartesian coordinate system whose origin is at the center of the circle. It is noted that ferrules used in conventional optical connectors (i.e., ST, SC and FC) have a 2.5 mm diameter while the ferrule disclosed in a preferred embodiment of the present invention has a diameter of 1.25 mm as utilized by the LC connection system. With the use of the smaller ferrule, the magnitude component of the eccentricity vector is proportionally reduced and thus precision is improved.

Rotating one of two interconnected ferrules typically changes the relative position of the fibers held within their passageways because of the eccentricity of the optical fiber cores with respect to the ferrules. Because it is very difficult to control the eccentricity of the optical fiber core in the ferrule in which it is terminated, it is difficult to achieve desired losses of 0.1 dB or less in single mode fibers without maintaining close tolerances so that the opposed cores are aligned to within about 0.7 microns. This scale of precision increases the manufacturing cost. If the total eccentricities of the two optical fiber ends to be joined are identical, or at least very nearly so, then a low-loss connection can be achieved by merely rotating, within the collar 14, one ferrule 20 with respect to the other, until maximum coupling is observed (minimum insertion loss).

Referring to FIGS. 7A-7D, the present invention enables fiber eccentricity to be compensated through the use of an indexing slot 44 between arms 42 in the terminus assembly 10. The terminus assembly 10 is designed such that it can be configured with one of six (hex) rotational positions relative to a master indexing key (protrusion boss 16 on the sliding collar 14). More or fewer registration features may be used. The key is an integral part of the sliding collar and although the preferred embodiment uses only one key, one or more keys may be used so long as unique orientation identification is retained.

Such a design enables the terminus assembly 10 to be installed in a connector body in one of six rotational positions (0 degrees, 60 degrees, 120 degrees, 180 degrees, 240 degrees, 300 degrees). The particular position selected is determined during fabrication of the connector by measuring fiber eccentricity, linearly moving the inner main body 12 relative to collar 14 along axis A from a position (FIG. 7A) in which relative rotation between inner main body 12 and collar 14 is prevented by engagement between indexing slot 44 and indexing section 40 a sufficient distance (as shown n FIG. 7B) to permit relative rotation between inner main body 12 and collar 14. The inner main body 12 is then rotated relative to collar 14 (FIG. 7C) by an amount based on optical power loss minimization measurement such that the arms 42 of the indexing slot 44 are aligned with indexing section 40. Once in the desired rotational position, force is removed from collar 14 to permit spring 18 to bias collar away from ferrule 20 such that indexing slot engages indexing section 40 to prevent relative movement between the inner main body 12 and sliding collar 14.

The final requirement for a high optical performance connector is to align the terminus assembly to a specific location when installed into the connector body. As has been described above, this is accomplished by using a slot in the terminus cavity. When mated connectors are brought together, their structures both provide for the retention of orientation relative to the opposing optical terminus assemblies.

Although particular embodiments of the invention have been described and illustrated herein, it is recognized that modifications and variations may readily occur to those skilled in the art, and consequently, it is intended that the claims be interpreted to cover such modifications and equivalents. The novel features of the invention are set forth with particularity in the appended claims. The invention will be best understood from the following description when read in conjunction with the accompanying drawings.

What is claimed is:

1. An optical fiber connector comprising:
    a connector housing having first and second generally parallel, spaced apart first and second faces and at least one generally cylindrical receptacle for removably receiving an optical fiber terminus therein; and
    an optical fiber terminus within said receptacle, said terminus including an elongated body having a passage along a central axis with a portion of said optical fiber cable extending therethrough, said body further including an indexing section, and a ferrule secured to said first section of said body and having an end portion of said optical fiber cable therein, a collar positioned on said elongated body and having an engagement section for engaging said indexing section, the collar being movable along said axis between first and second operative positions, said first operative position being wherein relative rotational movement between said collar and said body is prevented and a second operative position in which said collar may rotate relative to said body, and a biasing member to bias said collar towards said first position.

2. The optical fiber connector of claim 1 further including a terminus locking member and an arcuate recess through which said terminus locking member may rotate from a first insertion position to a second locked position to lock said terminus within said receptacle.

3. The optical fiber connector of claim 2 wherein said terminus locking member is a boss extending from said terminus and said receptacle includes said arcuate recess therein.

4. The optical fiber connector of claim 3 including a first opening in said first face and a second opening in said second face, said ferrule extending through said first opening, said second opening being round with a slot extending therefrom, and said locking tab, said arcuate recess and said slot are dimensioned to permit said tab to pass through said slot and travel into said arcuate recess.

5. The optical fiber connector of claim 4 wherein said slot extends in a direction parallel to said central axis and along an edge of said round second opening.

6. The optical fiber connector of claim 4 wherein said arcuate recess includes a step for receiving said locking tab therein when said terminus is locked in said cavity.

7. The optical fiber connector of claim 1 wherein said receptacle has a forward wall adjacent said first face and wherein said elongated body has a forward shoulder engaging said forward wall within said receptacle, said biasing member exerting a spring force to bias said forward shoulder against said forward wall.

8. The optical fiber connector of claim 6 wherein said receptacle has a forward wall adjacent said first face and wherein said elongated body has a forward shoulder engaging said forward wall within said receptacle, said biasing member exerting a spring force to bias said forward shoulder against said forward wall and bias said locking tab within said step in said arcuate recess.

9. An optical fiber connector kit comprising:
a connector housing having front and rear generally parallel, spaced apart faces and at least one generally cylindrical receptacle extending therebetween for removably receiving an optical fiber terminus therein, said receptacle having a terminus locking surface adjacent said rear face, each of the faces having an opening therein;
an optical fiber terminus configured to be positioned within said receptacle, said terminus including an elongated body having a passage along a central axis for receiving a portion of said optical fiber cable therethrough, said body including an indexing section, a collar having an engagement section for engaging the indexing section and a said terminus locking member for securing said terminus within said receptacle, the collar being positioned on the elongated body and being movable along said axis between first and second operative positions, said first operative position being wherein said engagement section engages said indexing section to prevent relative rotation between said collar and said body and a second position in which said collar may rotate relative to said body,
a ferrule for receiving an end portion of said optical fiber cable and dimensioned to extend from said opening in said front face; and
a biasing member to bias said collar towards said first position.

10. The optical fiber connector kit of claim 9 wherein said terminus locking member is dimensioned to engage said terminus locking surface within said receptacle.

11. The optical fiber connector kit of claim 9 further including an arcuate recess through which said terminus locking member may rotate from a first insertion position to a second locked position to lock said terminus within said receptacle.

12. The optical fiber connector kit of claim 11 wherein said terminus locking member is a boss extending from said terminus and said receptacle includes said arcuate recess therein.

13. The optical fiber connector kit of claim 12 wherein said arcuate recess includes a step for receiving said locking tab therein when said terminus is locked in said cavity.

14. The optical fiber connector kit of claim 12 including a first opening in said first face and a second opening in said second face, said ferrule extending through said first opening, said second opening being round with a slot extending therefrom, and said locking tab, said arcuate recess and said slot are dimensioned to permit said tab to pass through said slot and travel to said arcuate recess.

15. The optical fiber connector kit of claim 14 wherein said slot extends in a direction parallel to said central axis and along an edge of said round second opening.

16. The optical fiber connector kit of claim 9 wherein said receptacle has a forward wall adjacent said first face and wherein said elongated body has a forward shoulder engaging said forward wall within said receptacle, said biasing member exerting a spring force to bias said forward shoulder against said forward wall.

17. The optical fiber connector kit of claim 13 wherein said receptacle has a forward wall adjacent said first face and wherein said elongated body has a forward shoulder engaging said forward wall within said receptacle, said biasing member exerting a spring force to bias said forward shoulder against said forward wall and bias said locking tab within said step in said arcuate recess.

18. An optical fiber connector comprising:
a connector housing having at least one generally cylindrical receptacle for removably receiving an optical fiber terminus therein, said receptacle having a central axis and circular cross section;
an optical fiber terminus within said receptacle, said terminus including an elongated body having a passage along the central axis of said receptacle with a portion of said optical fiber cable extending therethrough, said body further including an indexing portion, a ferrule secured to said first section of said body and having an end portion of said optical fiber cable therein, a collar positioned on said elongated body and having an engagement portion for engaging the indexing portion, the collar being movable along said central axis between first and second operative positions, said first operative position being wherein relative rotational movement between said collar and said body is prevented and a second operative position in which said collar may rotate relative to said body, and a biasing member to bias said collar towards said first position; and
wherein said housing includes a first engagement structure and wherein said optical fiber terminus includes a second engagement structure, said first and second engagement structures interacting to retain said terminus within the housing.

19. The optical fiber connector of claim 18 wherein said first engagement structure is disposed within said receptacle.

20. The optical fiber connector of claim 18 wherein said first engagement structure is spaced from an opening in a rear face of the housing.

21. A method of assembling an optical fiber connector, comprising the steps of:
providing an optical fiber connector having a housing with at least one generally cylindrical receptacle for removably receiving an optical fiber terminus therein, said receptacle having a receptacle axis;
providing an optical fiber terminus, said terminus including an elongated body, a collar and a biasing member, said elongated body having an indexing section and a passage with a portion of optical fiber cable extending therethrough, said collar being movably positioned on said elongated body and having an engagement section to engage said index section to prevent relative rotation between said collar and said body, and said biasing member biasing said collar relative to said elongated body towards maintaining engagement of said index section and said engagement section;
testing the terminus for insertion loss to determine a position of optimum operational angular orientation,
orienting the elongated body relative to the collar at the position of optimal operational angular orientation;
utilizing the biasing member to secure said elongated body relative to said collar in order to maintain said body relative to the collar at the position of optimal operational angular orientation, and
inserting said terminus into said receptacle along said receptacle axis; and rotating said terminus within said receptacle to lock said terminus within said receptacle.

* * * * *